United States Patent [19]

Hamer et al.

[11] Patent Number: 5,420,226
[45] Date of Patent: May 30, 1995

[54] METHOD OF MAKING PHOTORECEPTOR CHARGE TRANSPORT LAYERS

[75] Inventors: Gordon K. Hamer; Dasarao K. Murti, both of Mississauga, Canada

[73] Assignee: Xerox Corporation, Stamford, Conn.

[21] Appl. No.: 104,696

[22] Filed: Aug. 11, 1993

[51] Int. Cl.$^6$ ............................................. C08G 64/00
[52] U.S. Cl. ........................................ 528/201; 430/59
[58] Field of Search ......................... 528/201; 430/59

[56] References Cited

U.S. PATENT DOCUMENTS

| | | | |
|---|---|---|---|
| 4,265,900 | 5/1981 | Rasmussen et al. | 424/273 |
| 4,306,008 | 12/1981 | Pai et al. | 430/59 |
| 4,346,158 | 8/1982 | Pai et al. | 430/59 |
| 4,588,666 | 5/1986 | Stolka et al. | 430/59 |
| 4,801,517 | 1/1989 | Frechet et al. | 430/59 |
| 4,806,443 | 2/1989 | Yanus et al. | 430/56 |
| 4,806,444 | 2/1989 | Yanus et al. | 430/56 |
| 4,888,411 | 12/1989 | Shannon et al. | 528/199 |
| 4,921,975 | 5/1990 | Shannon et al. | 549/228 |
| 4,935,487 | 6/1990 | Yanus et al. | 528/203 |
| 4,972,039 | 11/1990 | Shannon et al. | 528/371 |
| 5,164,276 | 11/1992 | Robinson et al. | 430/59 |
| 5,268,250 | 12/1993 | Matsuo et al. | 430/128 |
| 5,300,393 | 4/1994 | Odell et al. | 430/134 |

OTHER PUBLICATIONS

Daniel J. Brunelle et al., "Remarkably Selective Formation of Macrocyclic Aromatic Carbonates: Versatile New Intermediates for the Synthesis of Aromatic Polycarbonates", J. Am. Chem. Soc. 1990, 112, 2399–2402.
Daniel J. Brunelle et al., "Preparation and Polymerization of Bisphenol A Cyclic Oligomeric Carbonates", Macromolecules 1991, 24, 3035–3044.

Primary Examiner—James J. Seidleck
Assistant Examiner—Terressa Mosley
Attorney, Agent, or Firm—Oliff & Berridge; Eugene O. Palazzo

[57] ABSTRACT

A method of making a photoreceptor charge transport layer involves the steps of applying at least one macrocyclic carbonate oligomer to a supporting surface, and in situ polymerizing the at least one macrocyclic oligomer to form at least one high molecular weight polymer; the at least one macrocyclic oligomer being a cocyclic or ter-cyclic oligomer comprising bisphenol glycol bischloroformate moieties and dihydroxy arylamine moieties.

21 Claims, No Drawings

METHOD OF MAKING PHOTORECEPTOR CHARGE TRANSPORT LAYERS

BACKGROUND OF THE INVENTION

This invention relates to electrophotographic photoreceptors. More particularly, this invention relates to electrophotographic photoreceptor charge transport layers and methods of making them.

Photoreceptors are useful in electrophotographic imaging systems, especially xerographic imaging systems, and typically contain a substrate, a conductive layer, a charge blocking layer, a charge generating layer, and a charge transport layer. Other layers are often also included.

The charge transport layer typically contains an activating small molecule dispersed or dissolved in a polymeric film forming binder. For example, charge transport layers composed of aryl diamines dispersed in polycarbonates are known in the art. Reference is made, for example, to U.S. Pat. No. 4,265,900. Charge transport layers composed of carbonatearylamine polymers are also known in the art. Reference is made, for example, to U.S. Pat. Nos. 4,806,444; 4,935,487; and 4,806,443, all to Yanus et al.

Generally, solvents are used to apply charge transport polymer layers to the surface of the photoreceptor. However, volatile organic solvents are undesirable because their emissions are harmful to the environment. Therefore, it is continually desirable to avoid the use of such solvents.

Conventional organic photoreceptors are made by solution coating techniques using preformed polymers. Reference is made, for example, to the Yanus et al. patents listed above. The use of preformed polymers poses several restrictions, including: 1) the use of solvents, which is undesirable for the reasons given above; 2) choice of solvents is limited by polymer solubility; 3) solution concentration is limited by polymer solubility and viscosity; 4) maximum polymer molecular weight is limited by required coating viscosity; and 5) the polymer cannot be crosslinked, which significantly limits its usefulness in liquid ink applications.

Although excellent toner images may be obtained with multilayered belt photoreceptors that are developed with dry developer powder (toner), it has been found that these same photoreceptors become unstable when used with liquid development systems. These photoreceptors suffer from such problems as cracking and crazing in critical charge transport layers during belt cycling; crystallization of the activating molecules in the charge transport layers; and phase separation of activating compounds. In addition, extraction of activating compounds caused by contact with the organic carrier fluid, isoparaffinic hydrocarbons, e.g., Isopar, or normal paraffinic hydrocarbons, e.g., Norpar ® hydrocarbons, commonly used in liquid developer inks, markedly degrades the mechanical integrity and electrical properties of the photoreceptor.

Cracks developing in the charge transport layers during cycling can be manifested as print-out defects adversely affecting copy quality.

SUMMARY OF THE INVENTION

The invention provides a method for applying a charge transport layer to a photoreceptor surface without using a solvent to apply the charge transport layer to the surface.

The photoreceptor charge transport layer has improved resistance to cracking and crazing induced by liquid ink carrier fluid.

The invention provides a method of making a charge transport layer. The charge transport layer is formed in situ on an underlying photoreceptor surface, and therefore does not require a solvent for its application to the surface. The invention is based on the discovery that certain macrocyclic carbonate oligomers, particularly cocyclic oligomers made from bisphenol glycol bischloroformate and dihydroxy arylamine and ter-cyclic oligomers made from bisphenol glycol bischloroformate, dihydroxy arylamine, and alkylene glycol bischloroformate, can undergo in situ polymerization on the photoreceptor surface and do not have to be polymerized first and then applied to the surface. In other words, the photoreceptor charge transport layer is applied to the underlying photoreceptor surface without using solution coating techniques. Thus, the present invention avoids the restrictions associated with solution coating techniques.

In a method of making photoreceptor charge transport layers according to the invention, at least one macrocyclic oligomer is applied to a surface, and the at least one macrocyclic oligomer is in situ polymerized to form at least one high molecular weight polymer. The macrocyclic oligomer is a co-cyclic or ter-cyclic oligomer comprising bisphenol glycol bischloroformate moieties and dihydroxy arylamine moieties. The ter-cyclic oligomer preferably comprises bisphenol glycol bischloroformate moieties, alkylene glycol bischloroformate moieties, and dihydroxy arylamine moieties.

In the present invention, the polymerization occurs in situ after or simultaneously with the coating of the macrocyclic oligomers. The use of a solvent may be avoided entirely by coating the macrocyclic oligomers as a melt or a powder before curing to form a high molecular weight polymer which then functions as a charge transport layer. The use of mixtures of different structured cyclic oligomers further allows the formation of high molecular weight polymers of exact stoichiometry which is not readily possible by known interfacial or melt transesterification processes for making polycarbonates.

The photoreceptor charge transport layer prepared according to the method of this invention has improved resistance to cracking and crazing induced by liquid ink carrier fluid.

DETAILED DESCRIPTION OF PREFERRED EMBODIMENTS

Preferred co-cyclic carbonates used in the present invention may have the general formula

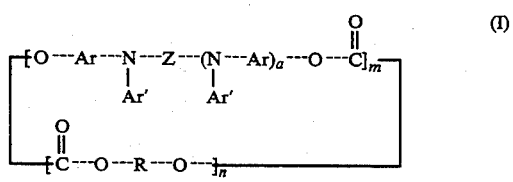

wherein Ar is selected from the group consisting of

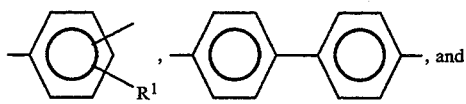, 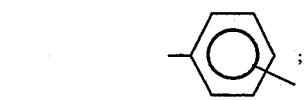

n is from 1 to 20; m is from 1 to 5; a is 0 or 1;
R is

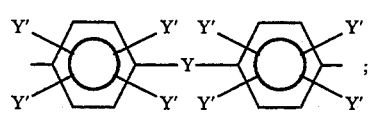

Y is —CH$_2$—, —C(CH$_3$)$_2$—, —C(CF$_3$)$_2$—, —O—, —S—, N—Ar, N—R$^1$,

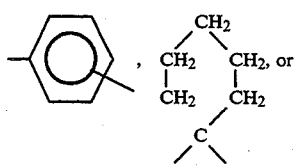

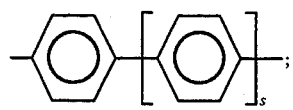

each Y' is independently hydrogen, methyl, or a halogen;
S is 0, 1 or 2;
R$^1$ is selected from the group consisting of —CH$_3$, —C$_2$H$_5$, —C$_3$H$_7$, and —C$_4$H$_9$;
Ar' is selected from the group consisting of

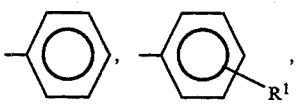

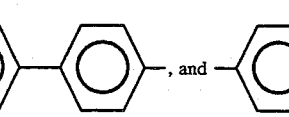

Z is selected from the group consisting of

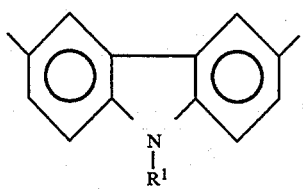

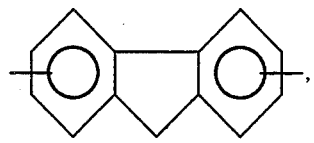

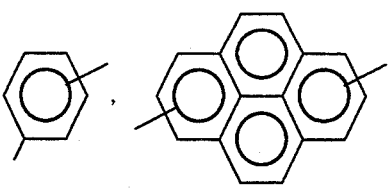

and —Ar—(Y)$_p$—Ar—, wherein p is 0, 1 or 2.
In preferred embodiments,
Ar is

Z is

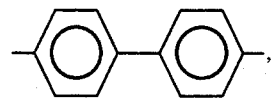

and R is

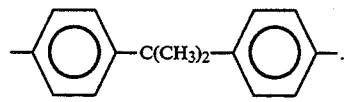

The co-cyclic oligomer may be formed by reacting effective amounts of bisphenol bischloroformate and a dihydroxy arylamine in the presence of triethylamine, base, solvent, and tetrahydrofuran for a time sufficient to form the co-cyclic oligomer. Polymerization of the co-cyclic oligomer is effected by combining the oligomer with a catalyst and heating the mixture for a time sufficient to complete polymerization. Typically, the catalyst is premixed with the oligomers.

Preferred ter-cyclic oligomers may have the general formula:

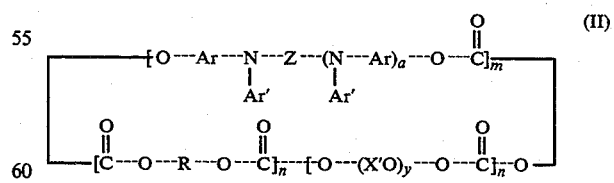

(II)

wherein Ar, Ar', Z, a, m, n, and R are as defined hereinabove, y is 1, 2 or 3, and X' is an alkylene radical selected from the group consisting of alkylene and isoalkylene groups containing 2 to 10 carbon atoms. Suitable alkylene groups represented by X' include, for example, —CH$_2$—, —C$_2$H$_4$—, —C$_3$H$_6$—, and —C$_4$H$_8$—.

The ter-cyclic oligomer may be prepared and polymerized in the same way as the co-cyclic oligomer except that an alkylene glycol bischloroformate is also present in the reaction mixture.

The cyclic oligomers used in this invention may be prepared according to the method disclosed in Brunelle et al., Jour. Amer. Chem. Soc., 1990, 112, 2399–2402, which is hereby incorporated by reference herein in its entirety except that in the present invention the Brunelle et al. method is modified to include dihydroxy arylamine, as discussed hereinabove.

The catalyst may be any of the catalysts known to promote polymerizations of carbonate oligomers. Examples of suitable catalysts include titanium diisopropoxide bis(2,4-pentanedionate), tetrabutylammonium tetraphenylborate, the tetramethylammonium tetraphenylborate, aluminum di(isopropoxide) acetoacetic ester chelate, tetraphenylphosphonium tetraphenylborate, and the like. A preferred catalyst is titanium diisopropoxide bis(2,4-pentanedionate) or tetrabutylammonium tetraphenylborate.

The reaction time depends upon the reaction temperatures and reactants used. Thus, less reaction time is required when higher reaction temperatures are used. Generally, increasing the reaction time increases the degree of polymerization.

Likewise, the amount of dihydroxy arylamine reacted with the bisphenol glycol bischloroformate and alkylene glycol bischloroformate will typically be that amount sufficient to produce a bisphenol glycol bischloroformate:dihydroxy arylamine:alkylene glycol bischloroformate molar ratio such that the dihydroxyarylamine is present in a range of from about 35 to about 50 weight percent and the two bischloroformates make up the balance. The relative ratio of bisphenol glycol bischloroformate to alkylene glycol bischloroformate is less important. In practice, the aryl bischloroformate is more reactive and so may predominate while the alkyl bischloroformate allows the polymer chain to be more flexible.

Various monomers can be incorporated into the reaction mixtures used to form the cyclic oligomers to produce crosslinking during the polymerization step. Examples of such monomers and processes for incorporating them into cyclic oligomers are disclosed, for example, in U.S. Pat. Nos. 4,921,975; 4,888,411; and 4,972,039; all of which are incorporated by reference herein in their entirety.

Examples of such monomers include tetraphenols such as, for example, bis(2,4-dihydroxy-3-methylphenyl) methane; 2,2',4,4'-tetrahydroxybiphenol; 2,2',4,4'-tetrahydroxybenzophenone; bis(2,4-dihydroxyphenyl) sulfide; bis(2,4-dihydroxyphenyl) sulfoxide; and bis(2,5-dihydroxyphenyl) sulfone; trisphenols such as 4-{4-[1,1-bis(4-hydroxyphenyl)ethyl]-α,α-dimethylbenzyl} phenol and 1,3,5-tris(4-hydroxy-α,α-dimethylbenzyl)-benzene.

The macrocyclic carbonate oligomers can then be coated onto a supporting surface, e.g., the supporting substrate or photogenerating layer of the photoreceptor. The oligomers are preferably coated in melt or powder form onto the supporting surface. However, the oligomers may also be solution coated. Their oligomeric nature allows their solution coating to avoid some of the problems associated with solution coating preformed polymers. For example, because they are oligomers, they are soluble in a wider range of solvents at higher concentrations and with much less impact on solution viscosity. Therefore, even in solution coating techniques, the use of the oligomers is superior to the use of preformed polymers. The thickness of the coating may be from about 20 to about 30 microns. Polymerization of the oligomers is preferably carried out at temperatures ranging from about 200° to about 300° C.

The final high molecular weight polymer is a copolycarbonate if the macrocyclic oligomer is a co-cyclic oligomer, or a polyethercarbonate if the macrocyclic oligomer is a ter-cyclic oligomer.

The co-polycarbonate may contain units of the formula:

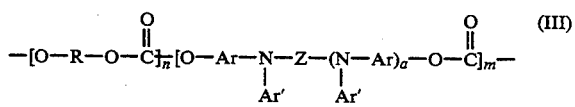

wherein R, Ar, Ar', Z, n, m, and a are as defined hereinabove.

The polyethercarbonate may contain units of the formula:

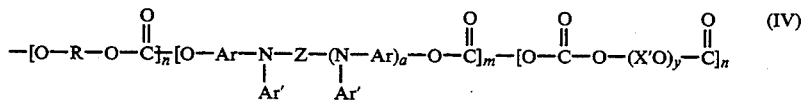

wherein R, Ar, Ar', Z, X', n, m, a, and y are as defined hereinabove.

The final polymers have a high molecular weight, typically at least 100,000 Daltons, preferably from 100,000 to 500,000 Daltons, and most preferably from 100,000 to 300,000 Daltons. The polycarbonates have molecular weight dispersity values ranging from about 1.8 to about 3.0 and preferably equal to about 2.

Dihydroxy arylamines useful in the method of this invention may have the formula:

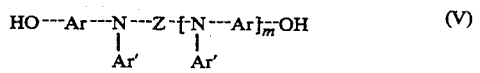

wherein Ar, Ar', Z, and m are as defined above.

Compounds represented by the above dihydroxy arylamine formula may be prepared by hydrolyzing an alkoxyarylamine. A typical process for preparing alkoxy arylamines is disclosed in Example I of U.S. Pat. No. 4,588,666 to Stolka et al., which is hereby totally incorporated by reference herein. Typical compounds represented by the above formula for dihydroxy arylamines include:

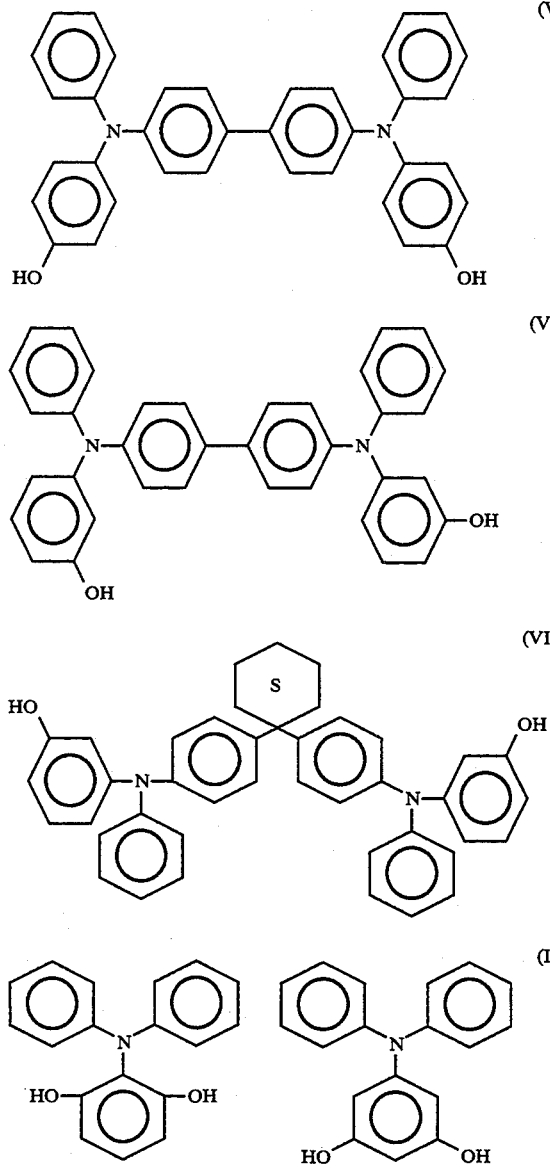

The most preferred hydroxy diamine for use in this invention is that represented by formula VI above, which is dihydroxy N,N,N',N'-tetraphenyl -[1,1'-biphenyl]-4,4'diamine.

Alkylene glycol bischloroformates useful in the method of this invention may have the formula

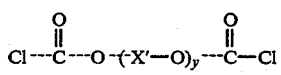

wherein X' and y are as defined above.

Examples of suitable alkylene glycol bischloroformates include ethylene glycol bischloroformate, diethylene glycol bischloroformate, triethylene glycol bischloroformate, and propylene glycol bischloroformate.

The macrocyclic oligomers are applied to the photoreceptor surface in melt or powder form or in solution.

The charge transport layer formed by the method of this invention can be of any suitable thickness. Typical final coating thickness of up to about 35 microns, such as about 20 to about 30 microns, or about 22 to about 26 microns would be suitable in some embodiments.

The multilayered photoreceptor will typically contain a substrate, a conductive layer, a charge blocking layer, a charge generating layer, and a charge transport layer. The photoreceptor may also contain additional coatings such as an anti-curl backing layer, one or more adhesive layers, and/or an overcoating layer.

The photoreceptor may be prepared by providing the substrate having an electrically conductive surface, applying a charge blocking layer on the electrically conductive surface, applying a charge generation layer on the blocking layer, and applying the charge transport layer on the charge generation layer. If desired, the charge transport layer may be applied to the electrically conductive surface and the charge generation layer may thereafter be applied to the charge transport layer.

The charge transport layer comprising the polymer formed from the co-cyclic or ter-cyclic oligomers is capable of supporting the injection of photogenerated holes from the charge generation layer and allowing the transport of these holes through the transport layer to selectively discharge the surface charge. When the photogenerating layer is sandwiched between the conductive layer and the charge transport layer, the transport layer not only serves to transport holes, but also protects the photoconductive layer from abrasion or chemical attack and therefore extends the operating life of the electrophotographic imaging member. The charge transport layer should exhibit negligible, if any, discharge when exposed to a wavelength of light useful in xerography, e.g., 4000 angstroms to 9000 angstroms. Therefore, the charge transport layer is a substantially non-photoconductive material which supports the injection of photogenerated holes from the generation layer. The transport layer is normally transparent when exposure is effected through the active layer to ensure that most of the incident radiation is used by the underlying charge carrier generator for efficient photogeneration. When used with a transparent substrate, imagewise exposure may be accomplished through the substrate with all light passing through the substrate. In this case, the transport material need not be transmitting in the wavelength region of use. For a more detailed discussion of the role of the charge transport layer in a photoreceptor, reference is made to U.S. Pat. No. 4,806,443, which is incorporated by reference herein in its entirety.

The electrophotographic imaging member of this invention may be used in a number of different known imaging and printing processes, including, for example, electrophotographic imaging processes, especially xerographic imaging and printing processes.

EXPERIMENTAL

Example 1

Example 1 illustrates the synthesis of a co-cyclic oligomer within the scope of this invention. The materials used are as follows:

bisphenol bischloroformate (recrystallized twice from hexane), 27.4 grams, 0.078 moles
dihydroxy N,N,N',N'-tetraphenyl-[1,1'-biphenyl]-4,4'-diamine, 18.2 grams, 0.035 moles
triethylamine, 4.8 ml
$CH_2Cl_2$, 400 ml
tetrahydrofuran, 50 ml
NaOH (9.75M solution), 62 ml water, 7 ml The reaction is conducted in a 10 liter round bottom flask equipped with a mechanical stirrer, a condenser, a septum, an addition funnel, and a heating mantle. To this flask are added 200 ml of $CH_2Cl_2$, 7 ml of water, 3 ml of NaOH (9.75M solution), and 2.4 ml of triethylamine. Stirring and gentle reflux are started. The bischloroformate and dihydroxy n,n,n',n'tetraphenyl-[1,1'-biphenol]-4,4'-diamine is dissolved in the remaining $CH_2Cl_2$ and 50 ml of tetrahydrofuran and added to the flask by means of a peristaltic pump over 30 minutes. During this time, the remaining sodium hydroxide solution is added by means of the addition funnel, and the triethylamine is added by means of a syringe pump. After 35 minutes, the reaction is terminated by the addition of 200 ml of 1M HCl solution. The reaction mixture is transferred to a separatory funnel where the organic and aqueous layers are separated, and the organic layer is washed with deionized water 3 times and then dried over $MgSO_4$. The methylene chloride is removed and the resulting solid is mixed with about 300 ml of acetone. Filtration of the acetone extract and subsequent removal of the acetone yields 25.4 grams of mixed co-cyclic oligomers of bisphenol A and dihydroxy N,N,N',N'-tetraphenyl-[1,1'biphenyl]-4,4'-diamine.

Example 2

Example 2 illustrates the polymerization of the co-cyclic oligomer prepared in Example 1. 2.0 grams of the co-cyclic oligomer, 4 ml of $CH_2Cl_2$, and 50 microliters of a 0.064 Molar solution of titanium diisopropoxide bis(2,4-pentanedionate) are added to a small vial and allowed to dissolve. This solution is poured into a petri dish and the methylene chloride is removed by gentle warming on a hot plate at 55° C. over about 2 hours. The heating steps are carried out with a programmable hotplate in a nitrogen flushed vacuum oven. Further removal of solvent is accomplished by heating rapidly to 300° C. and maintaining that temperature whereby the total ramp and hold time is 30 minutes. Polymerization is then carried out by heating the mixture to 300° C. and maintaining the mixture at that temperature for a total ramp and hold time of 30 minutes. Heating is then stopped and the sample is allowed to cool on the hotplate. The petri dish contains a hard, tough material that is removed with difficulty. GPC molecular weights (standardized against polystyrene) are $M_n$ of 44,800 and $M_w$ of 139,000 Daltons.

The hole transport properties of the copolymer were determined by xerographic evaluation. The photodischarge property was found to be mobility limited. Hole mobility values measured by time of flight techniques were equal to about $10^{-7}$ $cm^2/Vs$.

Example 3

Example 3 also illustrates the polymerization of the co-cyclic oligomer prepared in Example 1. 2.0 grams of the co-cyclic oligomer, 4 ml $CH_2Cl_2$, and 50 microliters of a 0.064 Molar solution of titanium diisopropoxide bis(2,4-pentanedionate) are added to a small vial and allowed to dissolve. This solution is poured into an aluminum foil dish and the methylene chloride is removed by gentle warming on a hot plate at 55° C. over about 2 hours. The heating steps are carried out with a programmable hotplate in a nitrogen flushed vacuum oven. Further removal of solvent is accomplished by heating rapidly to 135° C. and maintaining that temperature, with a total ramp and hold time of 30 minutes. Immediately after this step, polymerization is carried out by heating the mixture rapidly to 260° C. and maintaining that temperature for a total ramp and hold time of 45 minutes. Heating is then stopped and the sample is cooled on the hotplate. GPC analysis indicates that only partial polymerization has taken place and the material is a mixture of high polymer and cyclic oligomers. The crystalline oligomers are at the top of the sample and it is assumed that the lower temperature and higher viscosity had not allowed sufficient flow to heat all the sample. The sample, a hard disk, is turned over to place the upper side from the previous heating step next to the hotplate. The sample is returned to the hotplate between two sheets of aluminum with a small weight placed on top and is then heated again to 260° C. as described above. The resulting product is entirely a high molecular weight polymer with no oligomeric fraction and has GPC molecular weights $M_n$ of 38,500 and $M_w$ of 129,000 Daltons.

Example 4

Example 4 illustrates a method of making dihydroxy N,N,N',N'-tetraphenyl-[1,1'-biphenyl]-4,4'-diamine-bisphenol A tercyclic oligomers. The materials used are as follows:

bisphenol bischloroformate (recrystallized twice from hexane), 14.1. grams, 0.040 moles dihydroxy N,N,N',N'-tetraphenyl[1,1'-biphenyl]-4,4'-diamine, 18.2 grams, 0.035 moles diethyleneglycol bischloroformate, 8.1 grams, 0.035 moles triethylamine, 4.8 ml $CH_2Cl_2$, 350 ml tetrahydrofuran, 50 ml NaOH (9.75M solution), 62 ml water, 7 ml The cyclization reaction is conducted as described in Example 1 except that the initial charge of methylene chloride into the reactor is 150 ml and the reaction is carried out under nitrogen. After 35 minutes, the reaction is terminated by the addition of 200 ml of 1M HCl solution. The reaction mixture is transferred to a separatory funnel where the organic and aqueous layers are separated and the organic layer is washed again with 1N HCl and with deionized water 4 times, and then dried over $MgSO_4$. The methylene chloride is removed and the resulting solid is mixed with about 300 ml of acetone. Filtration of the acetone extract and subsequent removal of the acetone yields 17.6 grams of mixed tercyclic oligomers of bisphenol A, diethylene glycol, and dihydroxy N,N,N',N'tetraphenyl-[1,1'-biphenyl]-4,4'-diamine.

Example 5

Example 5 illustrates the polymerization of the tercyclic oligomer produced in Example 4. 2.0 grams of tercyclic oligomers of dihydroxy N,N,N',N'tetraphenyl-[1,1'-biphenyl]-4,4'-diamine, bisphenol A and diethylene glycol; 4 ml of $CH_2Cl_2$; and 50 microliters of a 0.064 Molar solution of titanium diisopropoxide bis(2,4-pentanedionate) are added to a small vial and allowed to dissolve. This solution is poured into an aluminum foil dish and the methylene chloride is removed by gentle warming on a hot plate at 55° C. over about 2 hours. The heating steps are carried out with a programmable hotplate in a nitrogen-flushed vacuum oven. More solvent is removed by heating rapidly to 135° C. and maintaining that temperature for a total ramp and hold time of 30 minutes. Immediately after this step, polymerization is carried out by heating rapidly to 260° C. and maintaining that temperature for a total ramp and hold time of 45 minutes. Heating is then stopped and the sample is cooled on the hotplate. GPC analysis indicates a $M_n$ of 5100 and $M_w$ of 15,000. Since these molecular weights are low, the material is returned to the oven for heating at 285° C. for 45 minutes. Only a slight increase in molecular weight is observed with a $M_n$ of 8000 and a $M_w$ of 16,100.

Xerographic evaluation of the terpolymer is made by dissolving the terpolymer in dichloromethane and coating the solution onto a trigonal selenium substrate of an electrophotographic.

The device has a thickness of about 10 microns and is charged to about 380 V. The photosensitivity as measured by E is about 12 ergs/cm².

The PIDC is dependent on light intensity, with the percent discharge and rate of delay of the surface potential increasing with intensity up to about 120 ergs/cm².

What is claimed is:

1. A method of making a photoreceptor charge transport layer, comprising the steps of applying at least one macrocyclic carbonate oligomer to a supporting surface, and in situ polymerizing the at least one macrocyclic oligomer to form at least one high molecular weight polymer; the at least one macrocyclic oligomer being a cocyclic or ter-cyclic oligomer comprising bisphenol glycol bischloroformate moieties and dihydroxy arylamine moieties.

2. A method according to claim 1, wherein the cocyclic oligomer has the general formula:

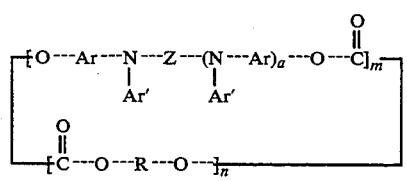

wherein Ar is selected from the group consisting of

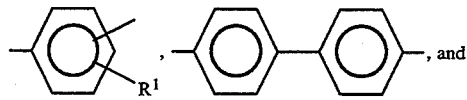

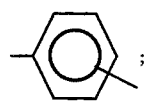

n is from 1 to 20; m is from 1 to 5; a is 0 or 1;
R is

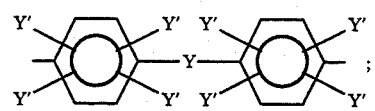

Y is —CH₂—, —C(CH₃)₂—, —C(CF₃)₂—, —O—, —S—, N—Ar, N—R¹,

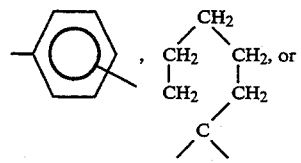

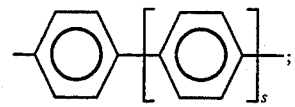

each Y' is independently hydrogen, methyl, or a halogen;
s is 0, 1 or 2;
R¹ is selected from the group consisting of —CH₃, —C₂H₅, —C₃H₇, and —C₄H₉;
Ar' is selected from the group consisting of

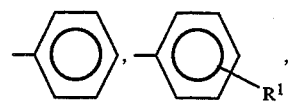

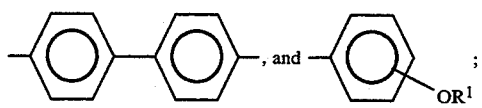

Z is selected from the group consisting of

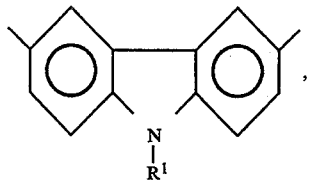

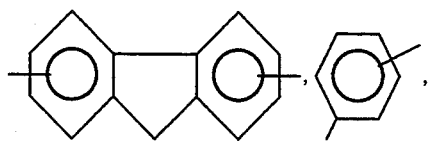

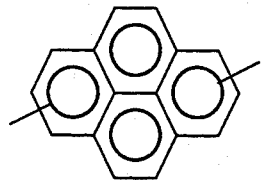

and —Ar—(Y)ₚ—Ar—, wherein p is 0, 1 or 2.

3. A method according to claim 2, wherein Ar is

Z is

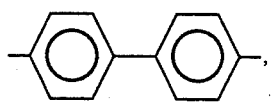

and R is

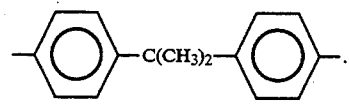

4. A method according to claim 1, wherein the tercyclic oligomer comprises bisphenol glycol bischloroformate moieties, alkylene glycol bischloroformate moieties, and dihydroxy arylamine moieties.

5. A method according to claim 1, wherein the tercyclic oligomer has the general formula:

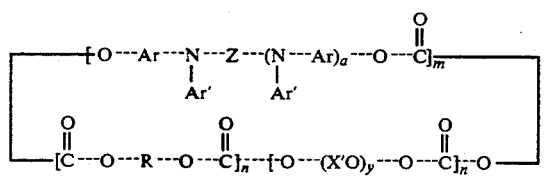

wherein Ar is selected from the group consisting of

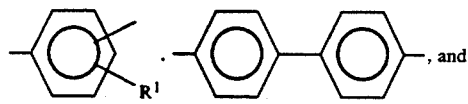

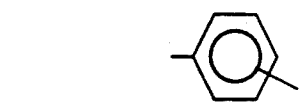

n is from 1 to 20; m is from 1 to 5; a is 0 or 1;
R is

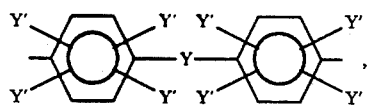

Y is —CH$_2$—, —C(CH$_3$)$_2$—, —C(CF$_3$)$_2$—, —O—, —S—, N—Ar, N—R$^1$,

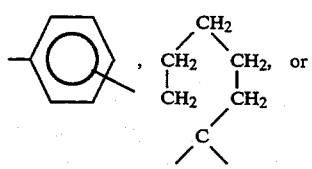

each Y' is independently hydrogen, methyl, or a halogen;

s is 0, 1 or 2;
R$^1$ is selected from the group consisting of —CH$_3$, —C$_2$H$_5$, —C$_3$H$_7$, and —C$_4$H$_9$;
Ar' is selected from the group consisting of

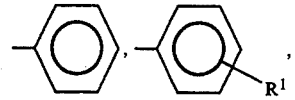

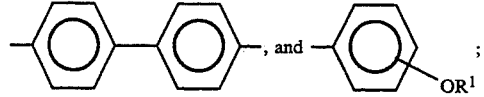

Z is selected from the group consisting of

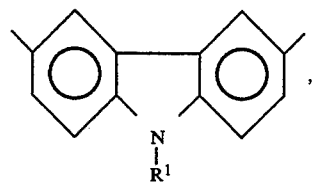

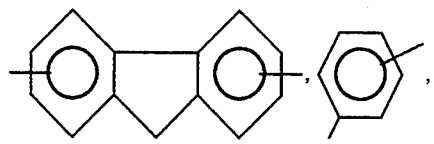

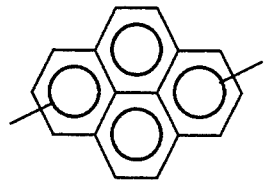

and —Ar—(Y)$_p$—Ar—, wherein p is 0, 1 or 2, and X' is an alkylene radical selected from the group consisting of alkylene and iso-alkylene groups containing 2 to 10 carbon atoms.

6. A method according to claim 5, wherein Ar is

Z is

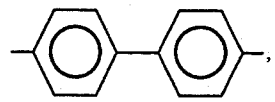

R is

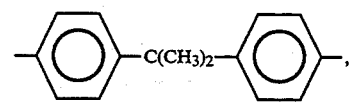

and X' is a —CH$_2$—CH$_2$—radical.

7. A method according to claim 1, wherein the at least one macrocyclic oligomer further comprises cross-linking monomer moieties.

8. A method according to claim 1, wherein the co-cyclic oligomer is formed by a method comprising the steps of reacting effective amounts of bisphenol glycol bischloroformate and dihydroxy arylamine in the presence of triethylamine, a base, a solvent, and tetrahydrofuran for a time sufficient to form the co-cyclic oligomer.

9. A method according to claim 8, wherein a cross-linking monomer is reacted with the bisphenol glycol bischloroformate and dihydroxy arylamine.

10. A method according to claim 1, wherein the ter-cyclic oligomer is formed by a method comprising the steps of reacting effective amounts of bisphenol glycol bischloroformate, dihydroxy arylamine and alkylene glycol bischloroformate in the presence of triethylamine, a base, a solvent, and tetrahydrofuran for a time sufficient to form the ter-cyclic oligomer.

11. A method according to claim 10, wherein a cross-linking monomer is reacted with the bisphenol glycol bischloroformate, dihydroxy arylamine and alkylene glycol bischloroformate.

12. A method according to claim 1, wherein the high molecular weight polymer is a polyether carbonate.

13. A method according to claim 1, wherein the high molecular weight polymer is a co-polycarbonate.

14. A method according to claim 1, wherein the high molecular weight polymer has a molecular weight of at least 100,000 Daltons.

15. A method according to claim 1, wherein the high molecular weight polymer has a molecular weight dispersity of from about 1.8 to about 3.0.

16. A method according to claim 1, wherein the at least one macrocyclic carbonate oligomer is applied to the surface in melt or powder form or in solution.

17. A composition suitable for use in a photoreceptor charge transport layer, comprising a co-polycarbonate of the general formula:

$$-[O-R-O-\overset{O}{\underset{\|}{C}}]_n-[O-Ar-\underset{Ar'}{\underset{|}{N}}-Z-(N-Ar)_a-O-\overset{O}{\underset{\|}{C}}]_m-$$

or a polyethercarbonate of the general formula:

$$-[O-R-O-\overset{O}{\underset{\|}{C}}]_{\overline{n}}[O-Ar-\underset{Ar'}{\underset{|}{N}}-Z-(N-Ar)_a-O-\overset{O}{\underset{\|}{C}}]_m-[O-\overset{O}{\underset{\|}{C}}-O-(X'O)_y-\overset{O}{\underset{\|}{C}}]_n$$

wherein Ar is selected from the group consisting of

[structures: phenyl with R¹, biphenyl, and phenyl]

n is from 1 to 20; m is from 1 to 5; a is 0 or 1;
R is

[structures showing biphenyl linked by Y group]

Y is $-CH_2-$, $-C(CH_3)_2-$, $-C(CF_3)_2-$, $-O-$, $-S-$, $N-Ar$, $N-R^1$,

[structures: phenyl with CH₃, cyclic structure with CH₂ groups, or phenyl-phenyl chain with s repeat unit]

each Y' is independently hydrogen, methyl, or a halogen;
s is 0, 1 or 2;
$R^1$ is selected from the group consisting of $-CH_3$, $-C_2H_5$, $-C_3H_7$, and $-C_4H_9$;
Ar' is selected from the group consisting of

[structures: phenyl, phenyl with R¹, biphenyl, and phenyl with OR¹]

Z is selected from the group consisting of

[carbazole structure with N-R¹]

[fluorene-type structure]

[phenyl and fused ring structure]

and —Ar—(Y)$_p$—Ar—, wherein p is 0, 1 or 2, and X' is an alkylene radical selected from the group consisting of alkylene and iso-alkylene groups containing 2 to 10 carbon atoms.

18. A photoreceptor charge transport layer prepared by a method comprising the steps of applying a macrocyclic oligomer to a supporting surface, and in situ polymerizing the at least one macrocyclic oligomer to form at least one high molecular weight polymer; the at least one macrocyclic oligomer being a co-cyclic or ter-cyclic oligomer comprising bisphenol glycol bischloroformate moieties and dihydroxy arylamine moieties.

19. A photoreceptor charge transport layer, comprising a copolycarbonate of the general formula:

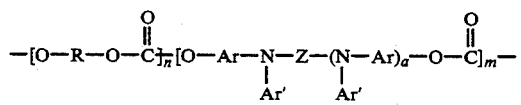

or a polyethercarbonate of the general formula:

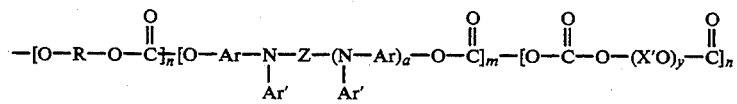

wherein Ar is selected from the group consisting of

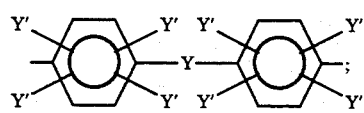

n is from 1 to 20; m is from 1 to 5; a is 0 or 1; R is

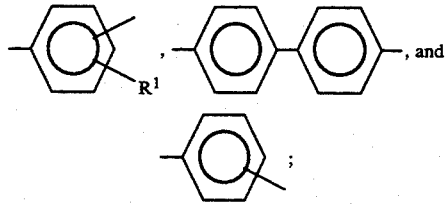

Y is —CH$_2$—, —C(CH$_3$)$_2$—, —C(CF$_3$)$_2$—, —O—, —S—, N—Ar, N—R$^1$,

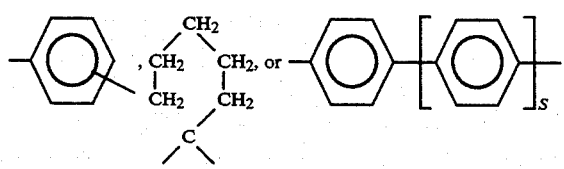

each Y' is independently hydrogen, methyl, or a halogen;
s is 0, 1 or 2;

R$^1$ is selected from the group consisting of —CH$_3$, —C$_2$H$_5$, —C$_3$H$_7$, and —C$_4$H$_9$;
Ar' is selected from the group consisting of

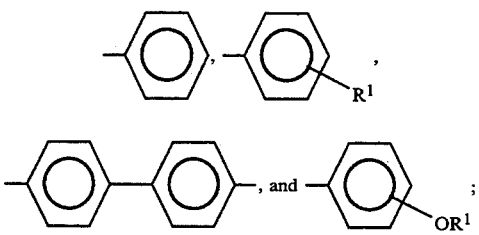

Z is selected from the group consisting of

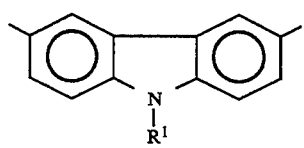

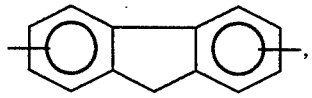

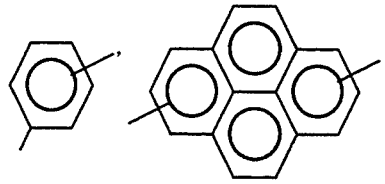

and —Ar—(Y)$_p$—Ar—, wherein p is 0, 1 or 2, and X' is an alkylene radical selected from the group consisting of alkylene and iso-alkylene groups containing 2 to 10 carbon atoms.

20. A photoreceptor comprising a charge transport layer prepared by a method comprising the steps of applying at least one macrocyclic oligomer to a supporting surface of the photoreceptor, and in situ polymerizing the at least one macrocyclic oligomer to form at least one high molecular weight polymer; the at least one macrocyclic oligomer being a co-cyclic or ter-cyclic oligomer comprising bisphenol glycol bischloroformate moieties and dihydroxy arylamine moieties.

21. A photoreceptor comprising a charge transport layer comprising a co-polycarbonate of the general formula:

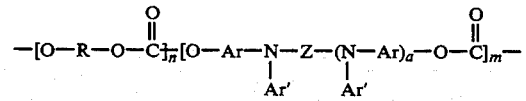

or a polyethercarbonate of the general formula:

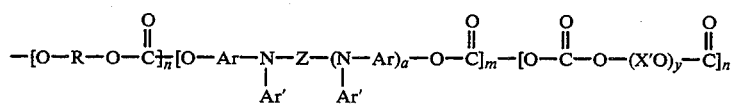

wherein Ar is selected from the group consisting of

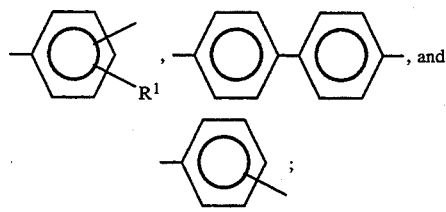

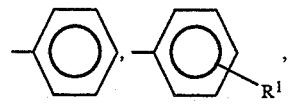

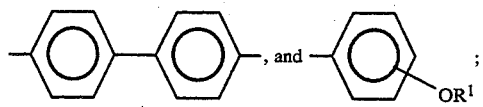

Z is selected from the group consisting of n is from 1 to 20; m is from 1 to 5; a is 0 or 1;
R is

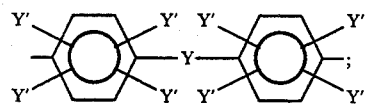

Y is —CH$_2$—, —C(CH$_3$)$_2$—, —C(CF$_3$)$_2$—, —O—, —S—, N—Ar, N—R$^1$,

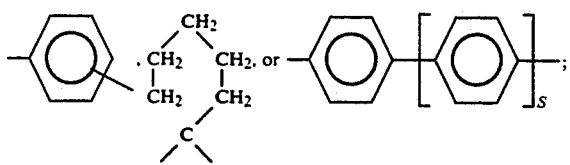

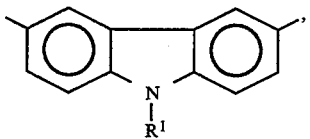

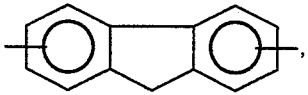

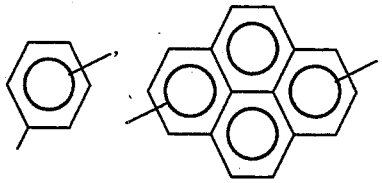

each Y' is independently hydrogen, methyl, or a halogen;
s is 0, 1 or 2;
R$^1$ is selected from the group consisting of —CH$_3$, —C$_2$H$_5$, —C$_3$H$_7$, and —C$_4$H$_9$;
Ar' is selected from the group consisting of and —Ar—(Y)$_p$—Ar—, wherein p is 0, 1 or 2, and X' is an alkylene radical selected from the group consisting of alkylene and iso-alkylene groups containing 2 to 10 carbon atoms.

* * * * *

UNITED STATES PATENT AND TRADEMARK OFFICE
CERTIFICATE OF CORRECTION

PATENT NO. : 5,420,226
DATED : May 30, 1995
INVENTOR(S) : Peter G. ODELL et al.

It is certified that error appears in the above-indentified patent and that said Letters Patent is hereby corrected as shown below:

On the cover page of the patent, after "[75] Inventors:" insert --Peter G. Odell,--; change "both" to --all--.

Signed and Sealed this

Twenty-fifth Day of July, 1995

Attest:

BRUCE LEHMAN

*Attesting Officer*     *Commissioner of Patents and Trademarks*